United States Patent
Ballesteros

(10) Patent No.: US 9,330,380 B2
(45) Date of Patent: May 3, 2016

(54) METHOD AND SYSTEM FOR MANAGING ONE OR MORE RECURRENCIES INCLUDING EXCLUSIONARY SCHEDULE

(75) Inventor: Brice Richard Ballesteros, Chantilly, VA (US)

(73) Assignee: Unisys Corporation, Blue Bell, PA (US)

( * ) Notice: Subject to any disclaimer, the term of this patent is extended or adjusted under 35 U.S.C. 154(b) by 112 days.

(21) Appl. No.: 13/339,970

(22) Filed: Dec. 29, 2011

(65) Prior Publication Data

US 2013/0174164 A1   Jul. 4, 2013

(51) Int. Cl.
  *G06F 9/46*   (2006.01)
  *G06Q 10/10*   (2012.01)
  *G06Q 10/06*   (2012.01)

(52) U.S. Cl.
  CPC .............. *G06Q 10/109* (2013.01); *G06Q 10/06* (2013.01); *G06Q 10/06375* (2013.01); *G06Q 10/1095* (2013.01)

(58) Field of Classification Search
  None
  See application file for complete search history.

(56) References Cited

U.S. PATENT DOCUMENTS

| | | | |
|---|---|---|---|
| 7,093,251 B2* | 8/2006 | Tsun et al. | 718/100 |
| 7,370,282 B2* | 5/2008 | Cary | 715/772 |
| 7,587,327 B2* | 9/2009 | Jacobs et al. | 705/7.14 |
| 8,073,725 B2* | 12/2011 | Loring et al. | 705/7.18 |
| 8,108,436 B2* | 1/2012 | Chhatrapati et al. | 707/796 |
| 8,166,145 B2* | 4/2012 | Tran et al. | 709/223 |
| 2007/0208604 A1* | 9/2007 | Purohit | G06Q 10/06375 705/7.19 |
| 2008/0114638 A1* | 5/2008 | Colliau | G06Q 10/06314 705/7.19 |
| 2009/0182608 A1* | 7/2009 | Tran et al. | 705/9 |
| 2011/0054976 A1* | 3/2011 | Adler | G06Q 10/109 705/7.18 |
| 2011/0208697 A1* | 8/2011 | Ramanujam | 707/626 |
| 2012/0304088 A1* | 11/2012 | Kho et al. | 715/764 |

* cited by examiner

*Primary Examiner* — Meng An
*Assistant Examiner* — Abu Z Ghaffari
(74) *Attorney, Agent, or Firm* — Robert P. Marley

(57) ABSTRACT

The present disclosure discloses methods and systems for managing one or more recurrencies. The method includes defining one or more recurrency tasks, each task having associated recurrency parameters. The method further includes identifying a recurrency period wherein the one or more recurrency tasks are disaggregated into individual scheduled events over the span of the recurrency period. Thereafter, a user-defined exclusionary schedule is applied to the disaggregated set of events. Subsequently, the edited recurrent tasks are output in a pre-defined file format.

7 Claims, 13 Drawing Sheets

Recurrence Application

Recurrence Application - Process Selection

Select an Option and Click "Next"

Select the type of Recurrency Conversion you want

⦿ Convert a Single Recurrency

◯ Convert Recurrency Listing

[Exit]  [Next]—302

Single Recurrence: Output Data

Output Results. XLS  — ☐ ✕

File  Edit  View  Insert  Format  Tools  Data  Window  Help  Adobe PDF

Total Day Interval: 4 Days

| Task Name | Start Date | Start Time | Completion Date | Frequency |
|---|---|---|---|---|
| TRX Software Phase 1 Installation | 03-May-11 | 9:00 AM | 19-Aug-11 | Once every 1 one week on Tuesday |
| TRX Software Phase 1 Installation | 10-May-11 | 9:00 AM | 19-Aug-11 | Once every 1 one week on Tuesday |
| TRX Software Phase 1 Installation | 17-May-11 | 9:00 AM | 19-Aug-11 | Once every 1 one week on Tuesday |
| TRX Software Phase 1 Installation | 24-May-11 | 9:00 AM | 19-Aug-11 | Once every 1 one week on Tuesday |
| | | | | |
| | | | | |

Multiple Recurrence : Text File

Input Data.text - Notepad  — □ X

1|Backup Monitoring |11-Jan-2012 |12:00 AM | 15-Feb-2013| E03 Wks: WED-ThU

2|BI Daily Java & OWB log | 31-Jan-2011|6:00 AM | 14-Feb-2012 | Once01MTH- D30

3|BI daily Java & OWB log| 28-Feb-2011 | 6:00 AM | 14-Feb-2012 | Once01MTH- D30

4|Daily Site Checks | 10-Jun-2011 |6:00 AM | 15-Sept-2015 | Once01MTH-D07

Multiple Recurrence: Output Data

Output Results.XLS — □ X

File  Edit  View  Insert  Format  Tools  Data  Window  Help  Adobe PDF

Total Day Interval: 4 Days

| Task Name | Start Date | Start Time | Completion Date | Frequency |
|---|---|---|---|---|
| Backup Monitoring | 11-Jan-2012 | 12:00 AM | 15-Feb-2013 | E03WKS:WED-THU |
| BI Daily Java and OWB Log | 31-Jan-2011 | 6:00 AM | 14-Feb-2012 | OnceE01MTH-D30 |
| BI daily Java & OWB log | 28-Feb-2011 | 6:00 AM | 14-Feb-2012 | OnceE01MTH-D30 |
| Daily Site Checks | 10-Jun-2011 | 6:00 AM | 15-Sept-2015 | OnceE01MTH-D07 |
|  |  |  |  |  |
|  |  |  |  |  |

900

FIG. 9

METHOD AND SYSTEM FOR MANAGING ONE OR MORE RECURRENCIES INCLUDING EXCLUSIONARY SCHEDULE

This application includes material that is subject to copyright protection. The copyright owner has no objection to the facsimile reproduction of the patent disclosure, as it appears in the Patent and Trademark Office files or records, but otherwise reserves all copyright rights whatsoever.

FIELD OF THE INVENTION

The instant disclosure broadly relates to the field of management software, and more particularly to methods and systems for managing one or more recurrent tasks.

BACKGROUND

Recurrency is a process of repeating one or more tasks after a pre-defined time interval. In day-to-day business life, recurrency is implemented in a variety of contexts, such as project management, resource management, and meeting management. Typically, individuals use many applications to perform their tasks, such as scheduling weekly meetings. Microsoft Outlook™ has various scheduling features related to email, calendar, and the like, which can be employed to set recurring meetings, conferences and the like.

Meetings often need to be scheduled on a recurring basis, such as every Friday or on the 15th of every month. To schedule such meetings, the user most often defines a task in Outlook™, or some similar calendaring program. The resulting meeting schedule is reflected as a set of calendar items; if the user wishes to view recurrency-related information such as start time, end time, or completion date, she is not able to view that data collectively in a calendaring program such as Outlook™. Furthermore, calendaring programs do not provide for exporting recurrency-related information in a pre-defined file format or in an itemized manner. One can export the entire calendar, or calendar events for a set period, but the recurrency of calendar items remains opaque. For automatic conversions, the calendaring program must be integrated with third party software such as SharePoint. Moreover, one cannot exclude events such as holidays; a process set to recur every Friday will remain on the schedule even if the Christmas holiday falls on Friday. Calendaring programs simply cannot cope with that level of complex recurrency.

Moreover, it is very difficult to quickly identify and view the total number of recurrent tasks in a particular month through the narrow view of a calendar, particularly when the calendar contains several tasks. A calendar view can only display a limited number of tasks on any given calendar day. Additionally, multiple recurrent tasks for different time intervals cannot be identified using calendaring programs.

SUMMARY OF THE INVENTION

Embodiments of the instant disclosure disclose methods and systems for managing one or more recurrencies. The method includes defining one or more recurrency tasks, each task having associated recurrency parameters. The method further includes identifying a recurrency period wherein the one or more recurrency tasks are disaggregated into individual scheduled events over the span of the recurrency period. Thereafter, a user-defined exclusionary schedule is applied to the disaggregated set of events. Subsequently, the edited recurrent tasks are output in a pre-defined file format.

These and other advantages, features, and objects of the claimed disclosure will become apparent upon review of the following detailed description of the preferred embodiments when taken in conjunction with the drawings and the appended claims.

BRIEF DESCRIPTION OF THE DRAWINGS

The figures illustrate a number of exemplary embodiments of the disclosure. Throughout the figures, like reference numerals refer to identical or functionally similar elements.

FIG. 3 shows an exemplary user interface screen displaying recurrency options;

FIG. 6 displays output file corresponding to the single recurrency;

FIG. 8 shows an exemplary text file containing recurrency-related information, for an embodiment of the instant disclosure;

FIG. 9 is an illustrative screenshot for output data corresponding to multiple recurrencies;

Figure 1:
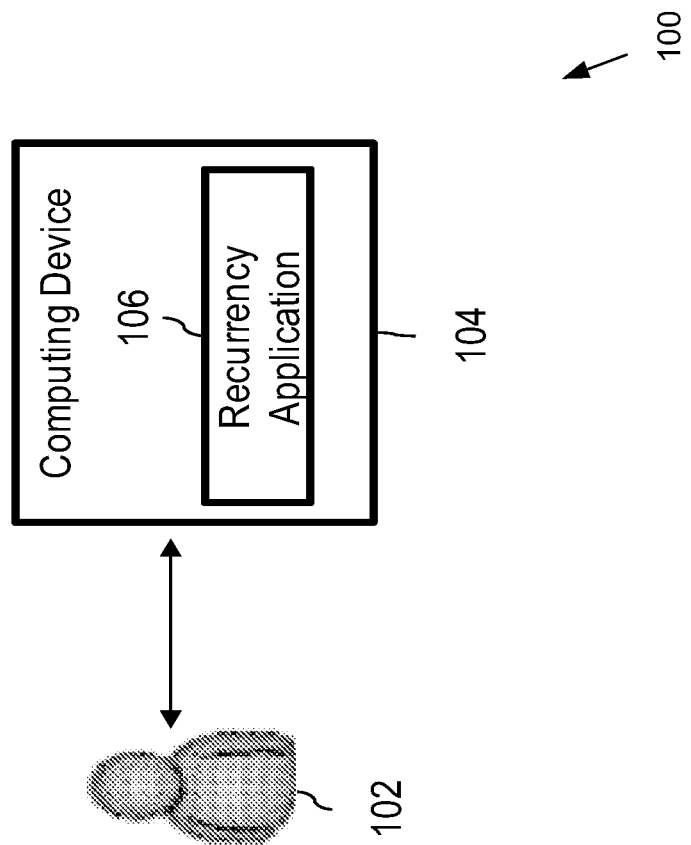
FIG. 1 depicts an exemplary embodiment of the present disclosure.

While various modifications and alternative forms of the disclosed system and method are contemplated, specific exemplary embodiments are disclosed in the drawings and are described in detail. It should be understood, however, that the drawings and detailed description are not intended to limit the scope of the claims contained to the particular form disclosed, but on the contrary, the disclosure is intended to cover all modifications, equivalents, and alternatives falling within the spirit and scope of the claimed invention as defined by the appended claims.

DETAILED DESCRIPTION

The following detailed description is made with reference to the figures. Embodiments are described to illustrate the disclosed system and method, not to limit their scope. With the insight provided by the instant disclosure, those of ordinary skill in the art should recognize a variety of equivalent variations on the description that follows.

Definition

In various embodiments, definitions of one or more terms that will be used in the document are described.

For the purpose of the disclosure, the term "recurrency" represents an activity or task that is repeated at pre-defined regular intervals.

The term "recurrency application" refers to a software application or tool configured to perform one or more pre-defined functions, related to managing one or more recurrent tasks.

The term "disaggregation" means applying recurrency information to a given period of time to produce a list of scheduled events. In detail, disaggregation is an automated process through which recurrency-established data is reduced and organized into specifically selected time intervals consisting of either days, weeks, or months.

Overview:

The present disclosure describes a method and a system for managing one or more recurrencies. In particular, the disclosure describes a recurrency application for managing recurrent tasks, thus allowing the user to define more than one recurrent task at a time. The application is used to identify, itemize, and manage recurrencies. Moreover, the application automates the recurrencies and identifies multiple recurrencies for different time intervals. Additionally, the application allows exporting of the recurrency-related data into a pre-defined file format, such as MS Excel™. The exporting feature allows the user to compile and view large amounts of data.

Embodiments of the disclosure can be implemented in a wide variety of business areas where recurrencies are scheduled. A few such examples include, project management, resource utilization, software installations, and so forth.

Exemplary Embodiment:

FIG. 1 illustrates an exemplary embodiment of the disclosure. In particular, FIG. 1 shows a user 102, a computing device 104, and a recurrency application 106.

User 102 initially installs the recurrency application 106 on computing device 104. Various examples of computing device 104 may include, but not limited to, a desktop, laptop, or mobile device. Computing device 104 represents a conventional device and its structure and associated functions are known in the art, and thus, need not be described in detail.

Recurrency application 106 runs on the computing device 104, allowing the user 102 to define one or more recurrent tasks. The recurrency application 106 can be based on the desktop, on the web, or in a cloud environment. Because the functionality of the recurrency application 106 permits operation of this embodiment, rather than any implementing computer code, the application may be developed using Visual Basic.Net or any development platform capable of implementing the functions as described, such as Java, C++, or the like. Moreover, the recurrency application 106 can be integrated with conventional calendar applications such as Microsoft Outlook™, IBM Lotus Symphony™, for managing meetings and conferences. Alternatively, the recurrency application 106 may be integrated with scanning applications. In other embodiments, the recurrency application 106 may be integrated with enterprise resource planning applications or data center applications and operations. Additionally, the recurrency application 106 is compatible with various operating systems including Windows and others known in the art.

For some embodiments, the recurrency application 106 may be embodied in the form of hardware, software, or firmware.

Figure 2:
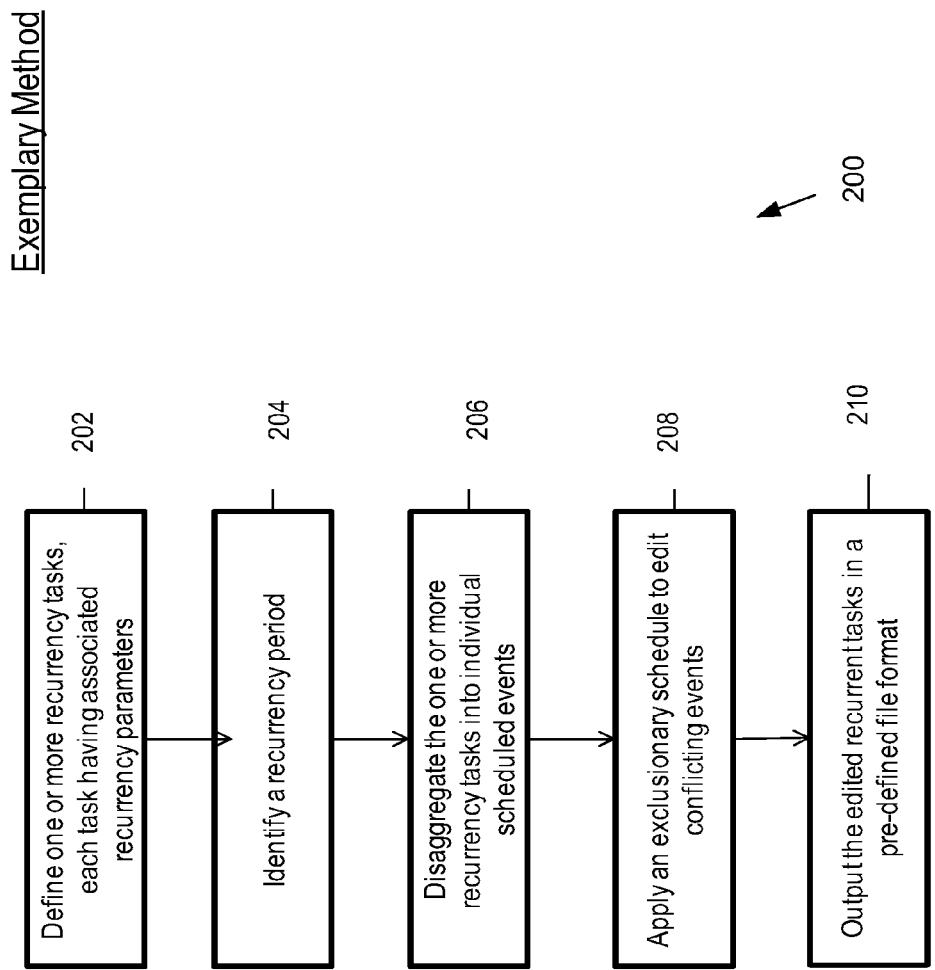
FIG. 2 illustrates a flowchart for managing one or more recurrencies, according to an embodiment of the present disclosure.

FIG. 2 illustrates an exemplary flowchart for managing one or more recurrent tasks.

The user initiates the recurrency application 106 on computing device 104. The user indicates whether the current system addresses single recurrency or multiple recurrencies. At step 202, one or more recurrency tasks are defined, each task having associated recurrency parameters. For a single recurrency, the user inputs recurrency-related information including, task name, range of recurrency, set configuration, any exclusionary schedule, and so forth. For multiple recurrencies, the recurrency definitions are provided as a pre-defined text file, using any program for providing text files, such as MS Notepad. The text file contains recurrency information as noted above. This information can be referred to as parameters or as pre-defined data elements.

Once the user inputs the required recurrency-related information, the system executes step 204 to identify recurrency period. Then, at step 206, the system disaggregates the one or more recurrency tasks into individual scheduled events over the span of the recurrency period. Disaggregation is the process by which the general recurrency information is applied to the pre-defined time interval to generate a set of calendar events. Thus, for example, consider a recurrency definition of a review meeting, to be held every Tuesday, at a specified time. Given a pre-defined time interval of November 2011, the disaggregation step 206 produces a set of meetings at the specified time on November 1, 8, 15, 22, and 29.

Thereafter, the recurrency application 106 at step 208 determines whether to apply an exclusionary schedule to the disaggregated set of events at step 206. The exclusionary schedule is applied only when the user establishes it. The exclusionary schedule is applied to remove any holidays or days that should not be counted within the scheduled recurrency. An exclusionary schedule is a set of rules that operates to modify the results of step 206. For example, an exclusionary rule might forbid scheduling an event for a weekend day, or for a specified holiday. In one embodiment, the exclusionary schedule may include, public holidays, national holidays, and so forth. Here, if an exclusionary schedule is applicable, the system would apply each individual rule to the set of disaggregated events. For example, if a rule prohibits events on national holidays, the system would employ a supporting list.

Once all the data is correctly defined, the recurrency application 106 analyzes and processes the required data. Subsequently, at step 210, the recurrency application 106 outputs the edited recurrent tasks in a pre-defined Excel™ file format. In other words, the recurrency application 106 automatically converts the recurrency-related information into a pre-defined file format. Requirements for the format in which users receive the output will vary. Depending upon its ultimate use, a spreadsheet, such as MS Excel™ may be preferred, or if the information is to be used in a presentation, MS PowerPoint™ may be more appropriate. The system is capable of converting the raw data into various conventional formats.

FIGS. 3 to 9 are screenshots of the recurrency application of the present disclosure. It will be understood that these screenshots are exemplary in nature. A wide range of modifications to the screenshots is of course possible without departing from scope of the disclosure.

The user initiates the recurrency application 106 on his or her computing device 104. Then, a dialog box such as that shown in FIG. 3 is displayed to the user. The dialog box offers two options: "Convert a single recurrency" and "Convert recurrency listing". The first option allows the user to convert one recurrent process at a time, employing the user interface depicted in FIG. 4. As seen, that dialog box allows the user to input data such as the task name, recurrency-related information such as start data, end date, recurrency type, and set configuration. A number of tools can be included in the dialog box most conveniently to collect each sort of information such as the Task Name via the text box 402. The date ranges can be selected using drop down menus 404 and 406. Other tools are likewise adapted to the information being collected.

Figure 4:
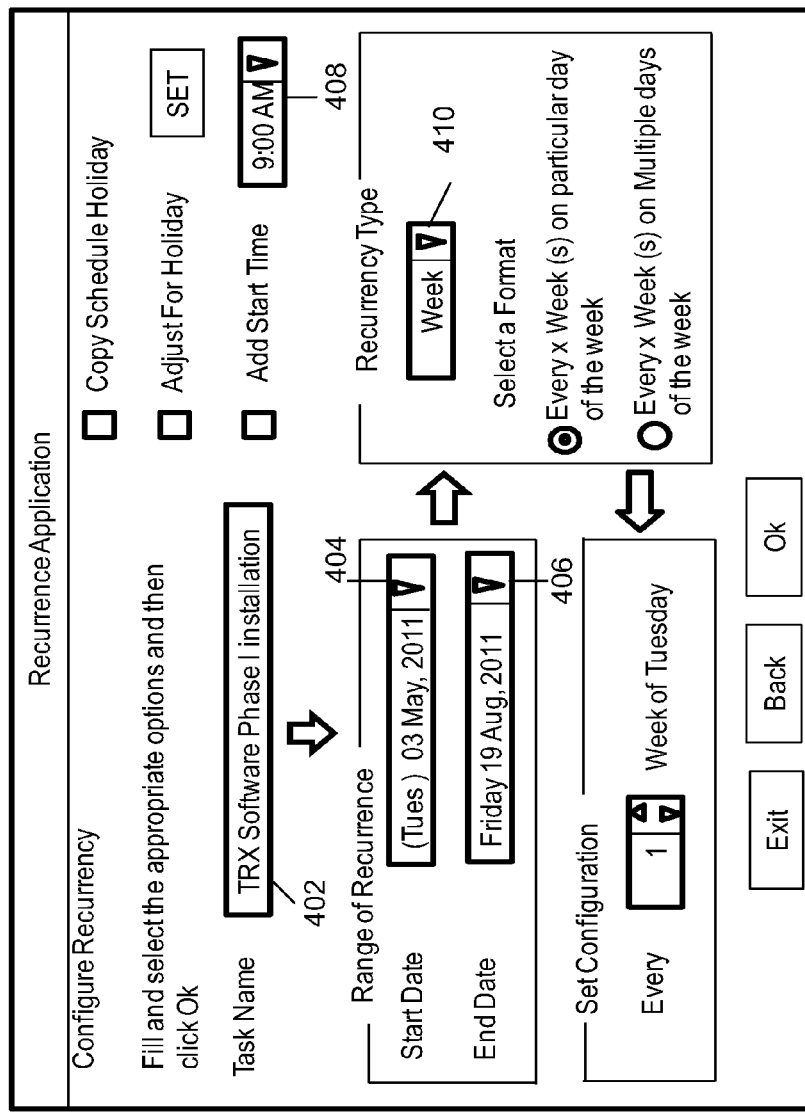
FIG. 4 is a screenshot for input data corresponding to single recurrency, in an embodiment of the disclosure.

Examining the data shown in FIG. 4 in detail, one can see that the task is identified as "TRX software phase I installation." The time period during which the system performs disaggregation is specified in drop-down lists 404, specifying the Start date, and 406, specifying the end date. Arrows in the dialog box indicate the flow of completion, so that the user is directed to box 410, asking for identification of the Recurrency Type, which he refers to interval such as "weekly", "monthly", and the like. As shown, the user has chosen "week," that choice triggers a further choice, in the Set Configuration block, asking whether the recurrency should occur on a given day of the week or at seven day intervals, starting on a specific date. Here, the user has chosen the weekly interval, falling on Tuesday. Other weekly intervals could start on a given start date and run for a second such as weekly meetings beginning on January 2. Other sets of choices are similarly tailored to the particular time interval. For activities occurring on a daily basis, for example, choices in the Set Configuration block may include "Daily", "Daily—No weekends", "Daily+Saturdays", "Daily+Sundays".

One or more options are available to the user for customizing the recurrency, as shown in the upper right-hand corner of the dialog box of FIG. 4. These options include, "Copy Holiday Schedule", "Adjust for Holiday", and "Add Start Time". If the user chooses "Copy Holiday Schedule", one or more exclusion days as set by the user in the "Adjust for holiday(s)" option are transferred to clipboard. Working with the exclusion schedule has been discussed in detail below.

Figure 5:
FIG. 5 is a snapshot depicting an exclusionary schedule for single recurrency.

If the user selects "Adjust for Holidays" option, then the user is allowed to establish exclusionary days that will not be included in the recurrency disaggregated information. For example, if the user wishes to establish recurrency for a daily task that starts on Dec. 14, 2012 and ends on Jan. 15, 2013. The user further wishes to exclude the Christmas holiday and other pre or post Christmas days from the recurrency. In such a scenario, when the user wants to exclude particular days from the recurrency, she can choose the option "Adjust for Holiday(s)". In an embodiment of the disclosure, the user may be allowed to set up to 14 exclusion days for the recurrency. To this end, the user can simply set a particular exclusion date using the drop menu 502 as shown in FIG. 5 and then requires clicking the checkbox as provided. As a result, the dates as provided are not included for the recurrency.

In certain embodiments, the user may choose an option "Add Start Time". The option allows the user to establish a start time for the recurrency that will be added to the disaggregated results. Further, the user may view a listing of times available using the drop menu 408.

The recurrency application 106 is designed to ensure that all required data elements have been provided before the recurrency-related information can be disaggregated. The user interface is configured to look for required data elements and to inform the user of any missing data elements.

After determining that all required data elements are present, the recurrency application 106 begins processing those data elements. Once that process is completed, a dialog box confirms the results of that action.

As noted above, the system provides output in a user-specified format. FIG. 6 represents an output in the form of an Excel file 600 containing the recurrency-related information such as task name, start date, start time, completion date, frequency, and the like. As shown there the task may be TRX Software Phase I installation, start date may be May 3, 2011, start time may be 9:00 AM, completion date may be 19 Aug. 2011 and the frequency may be once every one week on Tuesday. That process concludes the sequence for processing, disaggregating, and outputting information relating to a single recurrency.

Figure 7:
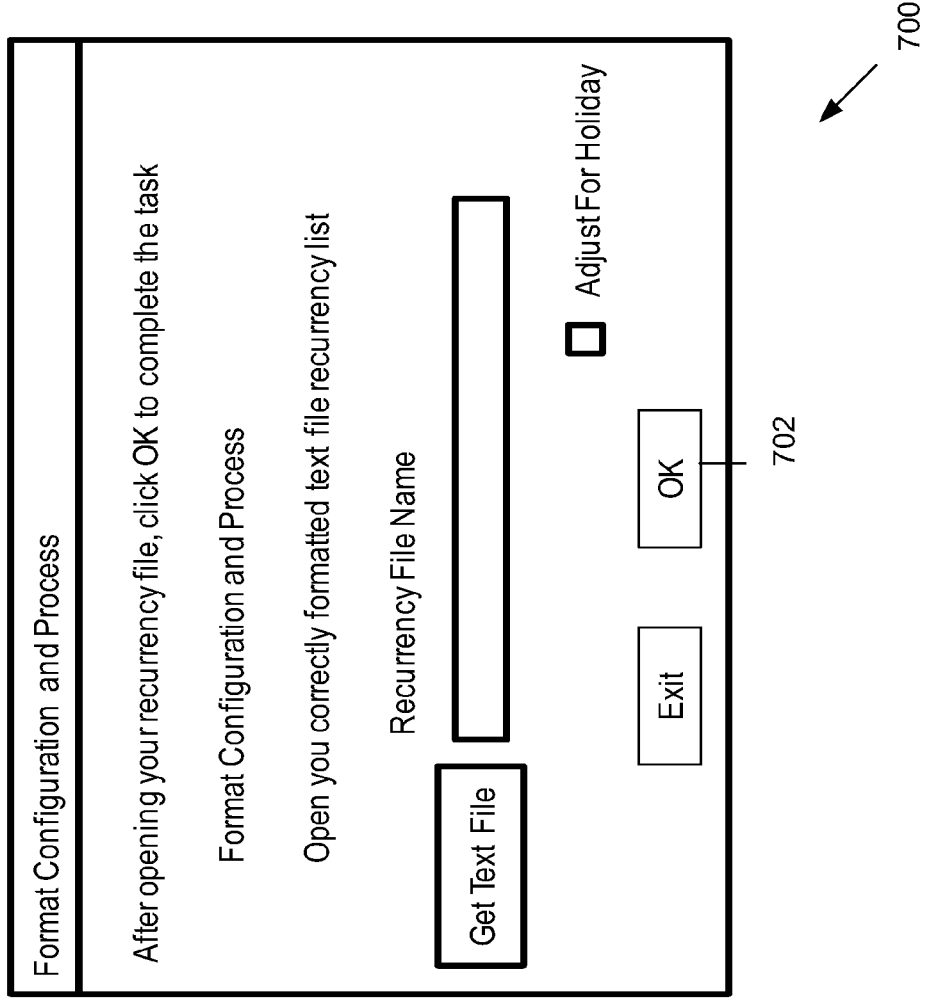
FIG. 7 is a screen for input data corresponding to multiple recurrencies.

Referring back FIG. 3, it will be remembered that the user may choose "Convert Recurrency Listing" option. That option allows the user to identify multiple recurrencies and their corresponding time intervals. While some embodiments may allow the user to input multiple recurrency data manually, the preferable manner for introducing that information into the system is through a text file, generated in a format such as MS Notepad, as shown in FIG. 6. The user can input the text file using "Get text File" option as shown in FIG. 7, which allows the user to specify the text file and to set out processing options.

FIG. 8 illustrates an exemplary text file containing the required recurrency details. The text file contains multiple recurrent tasks, setting out data such as task name, start date, start time, end date or completion, and frequency code. As seen, the recurrency data is set out in a set of delimited fields, with data elements separated by predetermined text items. Here, data items are separated by the pipe symbol pipe (|). If desired, the rules for processing recurrency data can include a configuration for generating a primary key, as is well known in data structuring circles.

After validating the data and executing the disaggregation, the resulting disaggregated data is output in a format chosen by the user. In one embodiment, the output is fed to a Microsoft Excel file called "Output Results.xls" 900 as shown in FIG. 9. In an exemplary embodiment, the data elements may be provided in a particular order from left to right as follows: primary key, task name, recurrency start date, recurrency start time, recurrency end date, and task frequency. The data elements are provided in the text file as mentioned above. The illustrated report takes in the following data items: 12|PIP Server Check|03-Jan.-2011|10:00 AM|30-Oct.-2014|DailyNOWKE, wherein 12=primary key
    PIP Server Check=task name
    3 Jan. 2011=start date
    10:00 AM=start time
    30-Oct.-2014=completion date/end date
    DailyNOWKE=frequency code: The frequency code as mentioned means that the task is executed daily except on Saturday and Sunday.
    |=delimiter to separate the data elements In a particular embodiment, the primary key is numeric in nature and the task frequency is represented using the frequency code as shown below. The task frequency code may be both syntax and case sensitive. Examples of basic task frequency codes are provided in the table below:

| Abbreviation | Meaning |
| --- | --- |
| SAT | Saturday |
| SUN | Sunday |
| Nbr | Number |
| MTH | Month |
| WKD | Week Day |
| WKE | Week-End |

The following table lists additional, more complex task frequency codes:

| Task Frequency Code | Task frequency code explanation |
| --- | --- |
| DailyALL | The task occurs on a daily basis |
| DailyNOWKE | The task occurs on a daily basis excluding all Saturdays and Sundays |
| Daily + SAT | The task occurs on a daily basis excluding all Saturdays |
| Daily + SUN | The task occurs on a daily basis excluding all Sundays |
| OnceE03D Nbr range: 0-99 | The task occurs once every x number of days |
| OnceE02MTH-D21 | The task occurs every x number of |

-continued

| Task Frequency Code | Task frequency code explanation |
|---|---|
| Mth Nbr Range: 0-99 Day Nbr Range: 1-31 | months on day number x |
| E02MTH: 1st WKD Mth Nbr Range: 0-99 Range Type: 1st, 2$^{nd}$, 3$^{rd}$, LST Day Type: MON, TUE, WED, THU, FRI, SAT, SUN, Conditionals: WKD | The task occurs once every x number of months on a specific type of day Only ONE day type can be associated to this particular task frequency code WKD can only be used in conjunction with 1$^{st}$ or LST in the range type |
| E02WKS: MON-THU-SAT WK Nbr Range: 0-99 Day Type: Any combination of 3-digit day types | The task occurs every x number of weeks on either a particular day type or on a series of day types Acceptable 3digit day types are: MON, TUE, WED, THU, FRI, SAT, or SUN; multiple day types are separated by a dash |
| E02MTH: WED-FRI Mth Nbr Range: 0-99 Day Type: Any combination of 3-digit day types | The task occurs every x number of months on either a particular day type or on series of day types Acceptable 3-digit day types are: MON, TUE, WED, THU, FRI, SAT, or SUN; multiple day types are separated by a dash |

Error codes, in accordance with this particular embodiment, are listed below:

| Error Code | Brief Definition |
|---|---|
| NoPrimeKey | The primary key for the record referenced is not correctly defined or is out of sequential field order |
| NoDate | A start or end date is either not defined, incorrectly formatted or is out of sequential field order |
| NoRecurPrefix | The task frequency code is not recognized because of an excessive number of characters or does not comply with established formatting standards |
| RecurTooManyChars | The task frequency code is not recognized because of an excessive number of characters or does not comply with established formatting standards |
| Calc0ErrDayMth | The number of months or days established within the task frequency code cannot be defined; the numeric value within the frequency code reads either 0 or 00 |
| OnceSyntax>31NumErr | The number of days exceeds 31 where a task recurrence occurs once every x number of months on day number x |
| DailyRecurSynatxErr | The daily task frequency code is partially recognized but does not fully comply with established formatting standards |
| ESyantxErr | A task frequency code beginning with the letter "E" does not fully comply with established formatting standards |
| OnceSyntaxErr | The task frequency code does not comply with established formatting standards, where the task occurs once every x number of days |
| SyntaxNotComputable | The task frequency code does not comply with established formatting standards, where the task occurs once every x number of months on a specific type of day |

Additional error messages are shown below:

| Recurrency Item Feedback phrase | Brief Definition |
|---|---|
| Err: File selected is incompatible for processing | The file selected as the user's recurrency list does not generally comply with established formatting standards and cannot be processed |
| Pass: No format configuration errors | The text file selected as the user's recurrency list has no format or configuration errors |

Figure 10A:
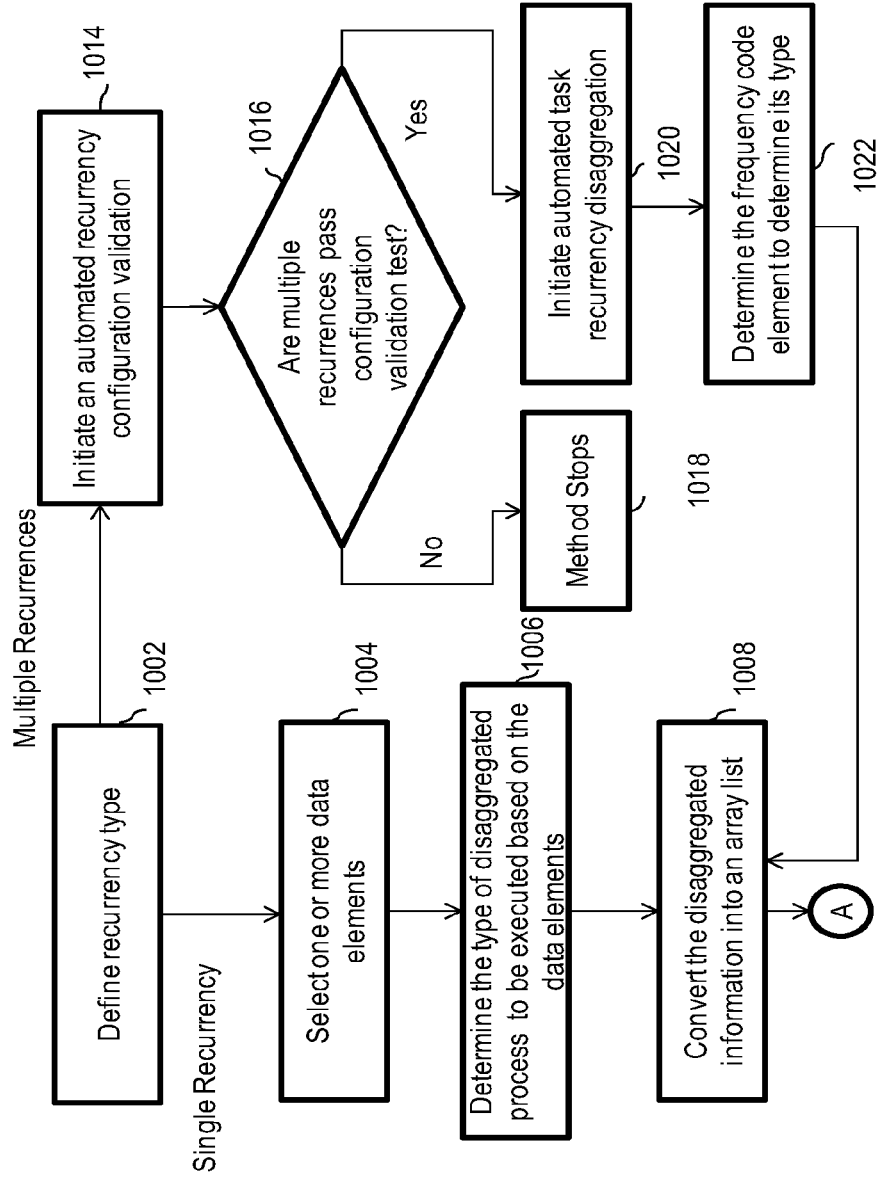
FIGS. 10A and 10B show a detailed flowchart for managing one or more recurrencies.
Figure 10B:
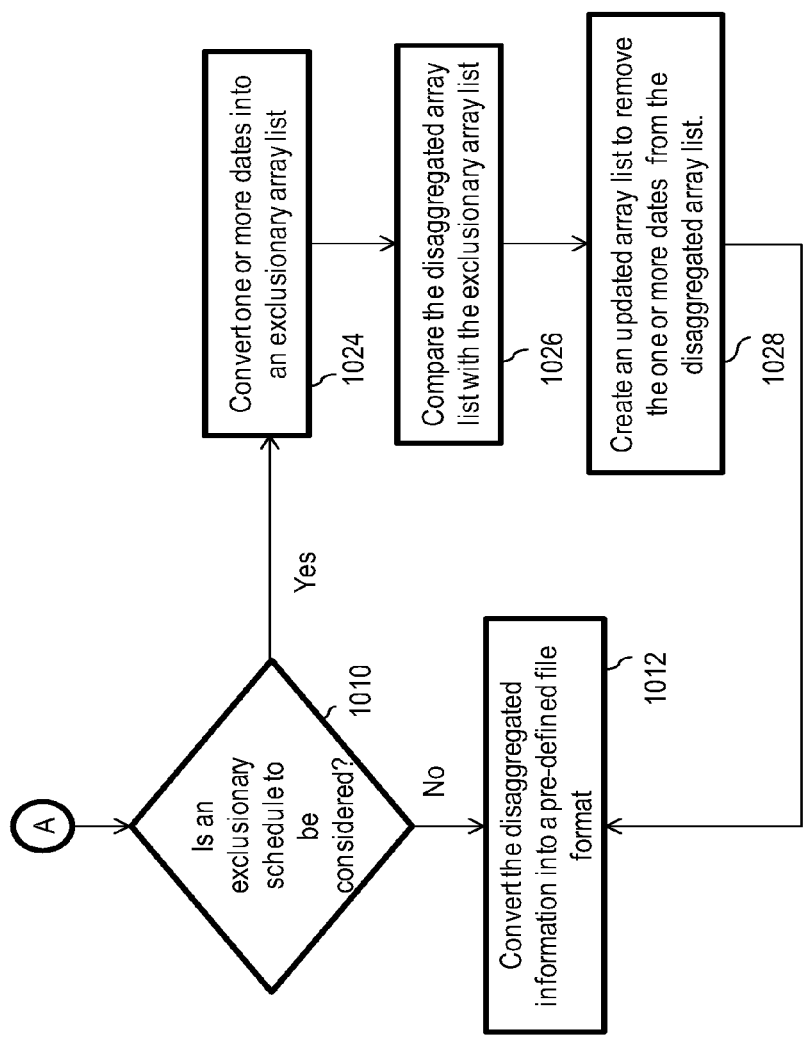

Exemplary flowchart for managing one or more recurrent tasks:

FIGS. 10A and 10B show a detailed method for managing one or more recurrent tasks, according to an exemplary embodiment of the disclosure.

In general, tasks are scheduled to occur in a repeated pattern over a finite temporal period. The recurrent periods are typically defined by initiating a specific start date and concluding with an end date. The recurrency application 106 offers a visual representation to view and interpret information, enabling the user to view a number of recurrent tasks in a highly organized manner. The recurrency application 106 lists, sorts, disaggregates, and itemizes recurrency data, thereby providing a comprehensive system for analyzing and understanding the relationships between different data elements. Additionally, the recurrency application 106 is capable of managing exclusionary schedules within the recurrent tasks. For example, a weekly meeting scheduled for each Monday from 4:00 PM to 4:30 PM falls on a holiday on one particular week that has been previously established within an exclusionary schedule. Consequently, that Monday's holiday would not be included in the disaggregated recurrency results.

Initially, the user defines recurrency type at step 1002. Two recurrency types are offered: single or multiple recurrencies. Based on that choice, processing follows either the "Single Recurrency" path toward step 1004 or the "Multiple Recurrencies" path toward step 1014, as seen in FIG. 10A. Following the "initial Single recurrency" path, step 1004 sets out and defines one or more data elements. As set out above, data element may include, task name, start and completion dates, and the like. Based on the data elements, the recurrency application 106 identifies and processes the type of disaggregation to be executed. The disaggregation process for a single recurrency primarily reduces and organizes the recurrency into an itemized set of date intervals based on a specified set of parameters unique to that recurrency. Conversely, multiple-recurrency processing entails not only a disaggregation process but also requires a validation process to be executed before the disaggregation occurs. In addition, multiple-recurrency processing may require an entirely different set of parameters to be evaluated than that of a single recurrency. The validation and disaggregation processes for both single and multiple recurrencies are achieved through a series of uniquely defined coding algorithms represented by several functions and directed procedures within the offering's code base. These functions and their associated procedures process several and various forms of recurrency parameter configurations. Disaggregation processes vary based on the type of recurrency being disaggregated and in what part of the process the disaggregation is being applied. Disaggregation process examples include single-recurrency parameter disaggregation, multiple-recurrency parameter disaggregation, exclusionary schedule disaggregation, and multiple-recurrency error detection disaggregation. Once all preliminary disaggregation processes conclude, the system begins to process, if applicable, the final disaggregation to be conducted—the exclusionary schedule.

At step 1010 (FIG. 10B), the system checks to determine whether an exclusionary schedule should be considered. If not, the disaggregated information is converted or written into a pre-defined file such as MS Excel spreadsheet, at 1012.

If the exclusionary schedule is required, then the user inputs one or more dates/days those need to be excluded for recurrency as set out above in connection with the dialog box of FIG. 4 and the holiday schedule of FIG. 5. The system converts these dates into an exclusionary array list at step 1024. Subsequently, at step 1026, the disaggregated array list is compared with the exclusionary array list. Based on the comparison, at step 1028, an updated array list is created to exclude all dates or days from the disaggregated array list. Finally, the disaggregated array list is converted into a desired file format, such as MS Excel™ spreadsheet, at step 1012.

Returning to FIG. 10A, defining recurrencies as multiple at step 1002 directs the processing path to 1014, where an automated recurrency configuration is validated by subjecting them to a multiple recurrency validation test at step 1016. Details of this test are set out below in connection with FIGS. 11A and 11B.

If the multiple recurrencies do not pass the test, then the method stops at step 1018.

If the multiple recurrencies pass the configuration validation test, then an automated recurrency disaggregation process is initiated and executed, at steps 1020 and 1022. In that process, each record in the text file is disaggregated into an array of individual scheduled events, based on the data elements of the recurrency item and the frequency information, as discussed above Processing passes to FIG. 10B, where the disaggregated recurrency information is run against an exclusionary list to pull out holidays, etc., as discuss in detail above. Then, at step 1028, the updated array list is created to remove the one or more dates from the disaggregated array list. Finally, the disaggregated information is converted into a chosen file format, such as an MS Excel™ spreadsheet at step 1012.

The MS Excel spreadsheet includes multiple entries of various tasks at different time intervals. The spreadsheet allows the user to easily view any information relating to one or more recurrent tasks at one glance.

Figure 11A:
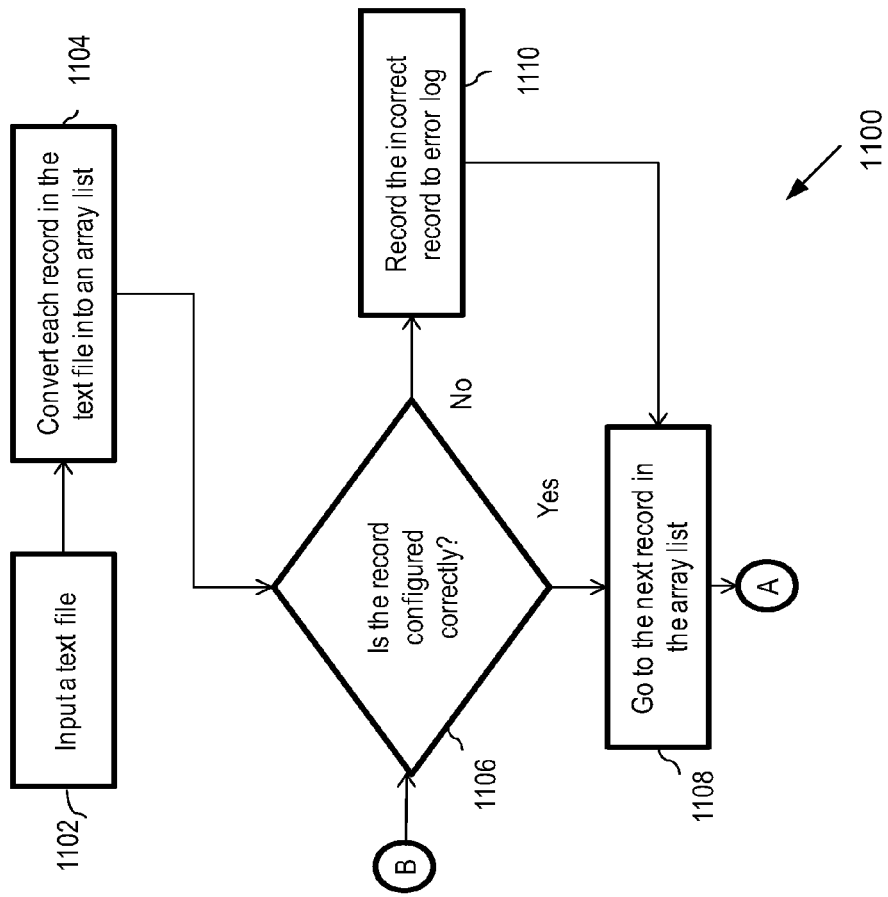
FIGS. 11A and 11B depict a method for formatting configuration validation corresponding to multiple recurrencies, in an embodiment of the instant disclosure.
Figure 11B:
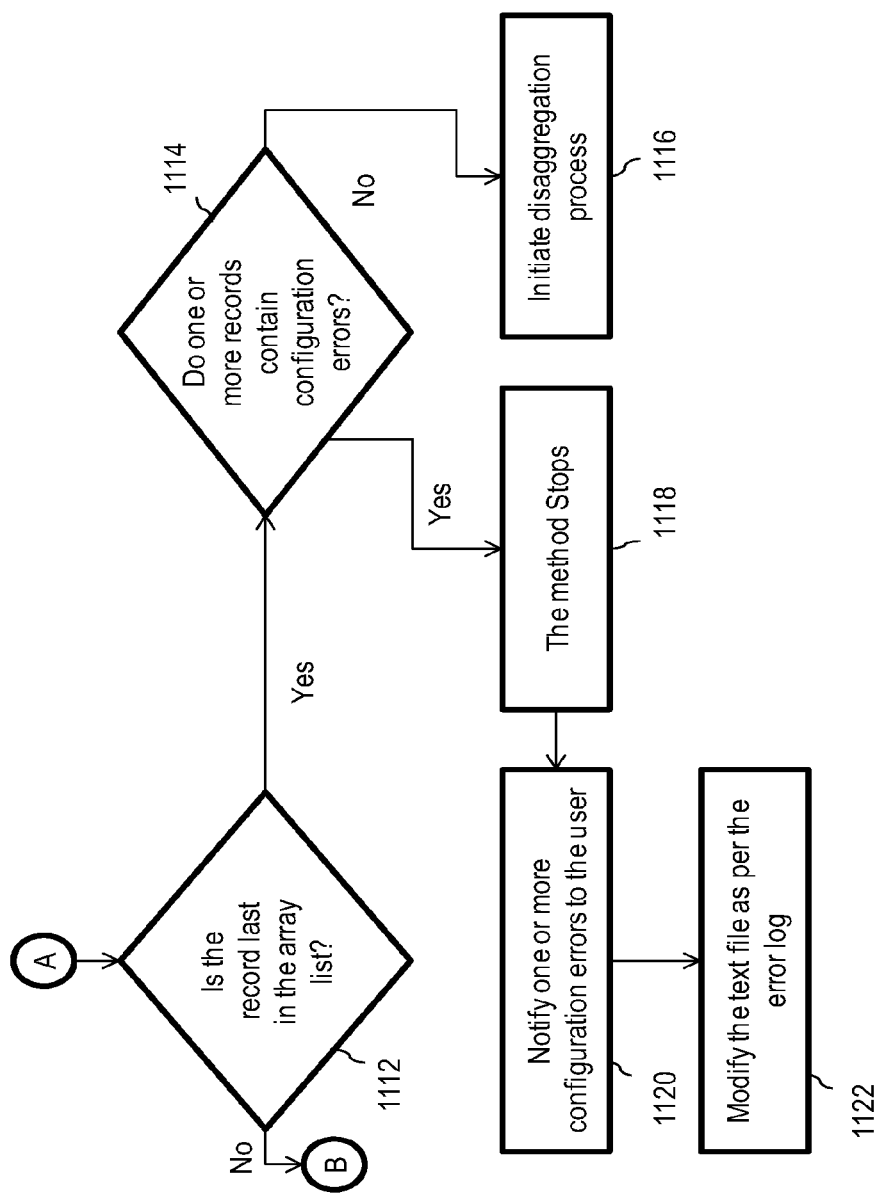

Exemplary Flowchart for Format Configuration Validation:

FIGS. 11A and 11B set out a method for data validation, according to an embodiment of the instant disclosure. The context for this test is set out in detail above.

To start, at step 1102, the user inputs a text file. The text file includes recurrency-related information in the form of one or more records, including data elements such as task name, start date, and so forth. Any program suitable for generating plain text files, such as MS Notepad, may generate this text file. Each record is then converted into an array list, at step 1104. That step sets out each text file line or record into an array having a pre-defined structure that structure configured for automated analysis. An example of correctly formatted and configured recurrency that can be used for multiple recurrencies, is outlined below:

12|PIP Server Check|03-Jan.-2011|10:00 AM|30-Oct.-2014|DailyNOWKE

Thereafter, the recurrency application 106 auto-generates an output containing (999) records in a spreadsheet containing each weekday starting from Jan. 3, 2011 through Oct. 30, 2014 excluding all weekend days falling on either a Saturday or Sunday. Additional data elements are included in the results such as the primary key number (12), the task name (PIP Server Check), the start time (10:00 AM), and the recurrency frequency code (DailyNOWKE). In case of an exclusionary schedule for this recurrency, any days falling on a weekday would be excluded from the recurrency results.

That analysis occurs at step 1106, where the structure is compared with the desired configuration and formatting. A preset table of rules can be provided containing the configuration standards, and conventional techniques can be employed to compare rules against data items, as known in the art. Steps 1108 and 1110 iterate the testing until all records are processed and record errors, respectively.

As seen in FIG. 11B, step 1112 determines whether the current record list is last in the array. If not, then the process loops back to step 1106 and continues. If the record is the last record, then step 1114 determines whether one or more records contain configuration errors. If configuration errors exist, then the method stops as mentioned at step 1118. Subsequently, at step 1120, the user is notified about the configuration errors and the user is required to correct the errors. Accordingly, the user needs to modify the text file according to the error log at step 1122. Then, the process moves back to step 1102.

If no configuration errors were found, then the recurrency disaggregation process is initiated at step 1116 and is executed until the process is accomplished. The disaggregation process has been discussed above in detail in conjunction with FIGS. 11A and 11B.

Those skilled in the art will understand that the system and methods set out in the discussion above may be combined or altered in specific adaptations of the disclosure. The illustrated system and methods are set out to explain the illustrated embodiments, and it should be anticipated that ongoing technological development will change the manner in which particular functions are performed. These depictions do not limit the scope of the disclosure, which is determined solely by reference to the appended claims.

The instant disclosure provides methods and systems for managing one or more recurrencies using the recurrency application 106. The recurrency application 106 identifies the total number of tasks for any recurrency over a specific period. The recurrency application 106 further facilitates the development, planning, monitoring, and reporting of recurrently performed tasks. Further, the recurrency application 106 presents itemized recurrent tasks providing the precise dates needed when collaborating with other recurrent tasks. Moreover, the recurrency application 106 identifies specific scheduling conflicts between different recurrent tasks scheduled at or near the same time. Over and above, the recurrency application 106 provides efficient management of business operations, where recurrent tasks need to be scheduled. Additionally, the recurrency application 106 analyzes, identifies, and takes into consideration one or more exclusionary schedules for recurrent tasks and their impact on the recurrent tasks resources and associated costs. Along with this, the recurrency application 106 allows the automatic conversion of the recurrencies into a pre-defined file format such as Excel.

The specification has set out a number of specific exemplary embodiments, but persons of skill in the art will understand that variations in these embodiments will naturally occur in the course of embodying the subject matter of the disclosure in specific implementations and environments. It will further be understood that such variations and others as well, fall within the scope of the disclosure. Neither those possible variations nor the specific examples set above are set out to limit the scope of the disclosure. Rather, the scope of claimed invention is defined solely by the claims set out below.

What is claimed is:

1. A computer-implemented method for managing one or more recurrencies of tasks, the method comprising:
- defining by a user one or more recurrency tasks, each recurrency task having associated recurrency parameters;
- identifying by a system recurrency application a recurrency period based on the recurrency parameters associated with the one or more recurrency tasks;
- disaggregating by the system recurrency application the one or more recurrency tasks into individual scheduled events over a span of the recurrency period by applying the recurrency parameters associated with the one or more recurrency tasks to the recurrency period;
- determining if an exclusionary schedule is to be applied, and if so, applying by the system recurrency application an exclusionary schedule to the individual scheduled events, wherein the exclusionary schedule is defined by the user and comprises one or more days that are to be excluded from the recurrency period to modify conflicting events; and
- outputting by the system recurrency application the edited recurrent tasks in a pre-defined file format.

2. The computer-implemented method of claim 1 further comprising the system recurrency application identifying different exclusionary schedules for the recurrency tasks.

3. The computer-implemented method of claim 1 further comprising initiating a formatting configuration validation process based on the recurrency parameters, wherein the formatting configuration validation process validates the configuration and format of the recurrency parameters provided by the user to the system recurrency application.

4. The computer-implemented method of claim 1 further comprising providing a pre-defined text file having recurrency-related information including the recurrency parameters.

5. The computer-implemented method of claim 4, wherein the pre-defined text file comprises one or more records having recurrency-related information including the recurrency parameters.

6. The computer-implemented method of claim 5, wherein each record of the one or more records has pre-defined data elements.

7. The computer-implemented method of claim 4 further comprising modifying the pre-defined text file based on one or more errors, wherein modifying the pre-defined text file based on one or more errors comprises correcting one or more portions of the recurrency-related information in the pre-defined text file that generated the one or more errors.

* * * * *